US012776822B2

(12) United States Patent
Hakola et al.

(10) Patent No.: US 12,776,822 B2
(45) Date of Patent: Oct. 27, 2026

(54) INDICATION OF FEASIBLE QUASI-COLOCATION (QCL) SOURCES FOR FAST BEAM INDICATION

(71) Applicant: Nokia Technologies Oy, Espoo (FI)

(72) Inventors: Sami-Jukka Hakola, Kempele (FI); Nitin Mangalvedhe, Hoffman Estates, IL (US); Frederick Vook, Schaumburg, IL (US); Matha Deghel, Paris (FR); Juha Pekka Karjalainen, Oulu (FI); Mihai Enescu, Espoo (FI); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 751 days.

(21) Appl. No.: 18/006,047

(22) PCT Filed: Jun. 30, 2021

(86) PCT No.: PCT/FI2021/050505
§ 371 (c)(1),
(2) Date: Jan. 19, 2023

(87) PCT Pub. No.: WO2022/029369
PCT Pub. Date: Feb. 10, 2022

(65) Prior Publication Data

US 2023/0276283 A1 Aug. 31, 2023

Related U.S. Application Data

(60) Provisional application No. 63/061,015, filed on Aug. 4, 2020.

(51) Int. Cl.

| | |
|---|---|
| ***H04B 7/06*** | (2006.01) |
| ***H04L 5/00*** | (2006.01) |
| ***H04W 24/10*** | (2009.01) |

(52) U.S. Cl.
CPC ....... *H04B 7/06968* (2023.05); *H04L 5/0051* (2013.01); *H04W 24/10* (2013.01)

(58) Field of Classification Search
CPC . H04B 7/06968; H04B 7/0695; H04L 5/0051; H04L 1/0026; H04L 5/0023;
(Continued)

(56) References Cited

U.S. PATENT DOCUMENTS

| | | | | |
|---|---|---|---|---|
| 11,563,537 | B2 * | 1/2023 | John Wilson | H04L 1/14 |
| 11,838,883 | B2 * | 12/2023 | Li | H04B 7/0626 |

(Continued)

FOREIGN PATENT DOCUMENTS

| | | | | |
|---|---|---|---|---|
| WO | WO-2019099659 A1 * | 5/2019 | | H04W 72/53 |
| WO | WO-2019138081 A1 * | 7/2019 | | H04W 72/23 |

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

(Continued)

*Primary Examiner* — Ayaz R Sheikh
(74) *Attorney, Agent, or Firm* — Lippes Mathias LLP

(57) ABSTRACT

Systems, methods, apparatuses, and computer program products for reporting of feasibility of activated transmission configuration indicator/transmission coordination indication (TCI) states. For example, a user equipment (UE) may determine whether one or more measurements satisfy one or more thresholds for one or more TCI states, and may transmit an indication of whether the one or more measurements satisfy the one or more thresholds. The UE may then deactivate at least one of the one or more activated TCI states, or may activate one or more additional TCI states,
(Continued)

based on the indication, and may use one or more of the activated TCI states for a downlink (DL) or uplink (UL) transmission.

20 Claims, 9 Drawing Sheets

(58) Field of Classification Search
CPC ... H04L 5/0048; H04L 5/0082; H04L 5/0092; H04W 24/10
See application file for complete search history.

(56) References Cited

U.S. PATENT DOCUMENTS

2019/0380053 A1 12/2019 Bai et al.
2024/0014975 A1* 1/2024 Zhou .................... H04L 5/0051

FOREIGN PATENT DOCUMENTS

WO 2019/193239 A1 10/2019
WO 2020/144637 A1 7/2020

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.
"3rd Generation Partnership Project; Technical Specification Group Radio Access Network; NR; Requirements for support of radio resource management (Release 16)", 3GPP TS 38.133, V16.3.0, Mar. 2020, 1169 pages.
"3rd Generation Partnership Project; Technical Specification Group Radio Access Network; NR; Multiplexing and channel coding (Release 16)", 3GPP TS 38.212, V16.1.0, Mar. 2020, pp. 1-146.
International Search Report and Written Opinion received for corresponding Patent Cooperation Treaty Application No. PCT/FI2021/050505, dated Nov. 10, 2021, 18 pages.
"3rd Generation Partnership Project; Technical Specification Group Radio Access Network; NR; Physical layer procedures for data (Release 16)", 3GPP TS 38.214, V16.2.0, Jun. 2020, pp. 1-163.

* cited by examiner

INDICATION OF FEASIBLE QUASI-COLOCATION (QCL) SOURCES FOR FAST BEAM INDICATION

RELATED APPLICATION

This application was originally filed as PCT Application No. PCT/FI2021/050505, filed on Jun. 30, 2021, which claims priority from U.S. Application No. 63/061,015, filed on Aug. 4, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for indication of feasible QCL sources for fast beam indication.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include determining, by a user equipment, whether one or more measurements satisfy one or more thresholds for one or more activated transmission configuration indicator states (or one or more activated transmission coordination indication states). The method may include transmitting, to a network node, an indication of whether the one or more measurements satisfy the one or more thresholds.

In a variant, the indication may include an uplink-focused transmission configuration indicator state feasibility report for fast uplink beam and/or panel selection. In a variant, the method may include updating the one or more activated states based on the indication, or updating the one or more activated transmission configuration indicator states based on another indication from the network node. In a variant, the method may include receiving a scheduling of at least one transmission using at least one of the one or more activated transmission configuration indicator states after updating the at least one of the one or more activated transmission configuration indicator states. In a variant, transmitting the indication may further include transmitting the indication in conjunction with one or more reports of one or more other measurements, or transmitting the indication separate from transmitting the one or more reports of the one or more other measurements.

In a variant, transmitting the indication may further include transmitting the indication at a reporting time periodicity that differs from transmission of the one or more reports. In a variant, the one or more thresholds may be at least one of: received via signaling, pre-configured, or based on a reported channel quality indicator. In a variant, the method may include receiving a configuration of at least one state, receiving a reporting configuration or a resource configuration, and receiving, prior to determining whether the one or more measurements satisfy the one or more thresholds, an activation of one or more of the at least one state. The activation may result in the one or more activated transmission configuration indicator states.

In a variant, the indication may indicate at least one of that at least one of the one or more measurements satisfies at least one of the one or more thresholds, or that at least one of the one or more measurements fails to satisfy at least one of the one or more thresholds. In a variant, determining whether the one or more measurements satisfy the one or more thresholds may further include determining that the one or more measurements fail to satisfy the one or more thresholds, and transmitting the indication may further include transmitting the indication of the one or more measurements failing to satisfy the one or more thresholds.

In a variant, the method may include selecting one or more reference signals corresponding to the one or more activated transmission configuration indicator states, and excluding any reference signals already indicated in a reference signal-related report transmitted to the network node. In a variant, determining whether the one or more measurements fail to satisfy the one or more thresholds may further include determining that the one or more measurements for the one or more selected reference signals fail to satisfy the one or more thresholds, and transmitting the indication may further include transmitting the indication of the one or more measurements for the one or more selected reference signals failing to satisfy the one or more thresholds.

According to a second embodiment, a method may include receiving, by a network node, an indication of whether one or more measurements satisfy one or more thresholds for one or more activated transmission configuration indicator states (or one or more activated transmission coordination indication states). The method may include updating at least one of the one or more activated transmission configuration indicator states based on the indication.

In a variant, the indication may include an uplink-focused transmission configuration indicator state feasibility report for fast uplink beam and/or panel selection. In a variant, the method may include assuming an updated set of activated transmission configuration indicator states based on the at least one updated state. In a variant, the method may include scheduling at least one transmission using at least one of the updated set of activated transmission configuration indicator states. In a variant, receiving the indication may further include receiving the indication in conjunction with one or more reports of one or more other measurements, or receiving the indication separate from receiving the one or more reports of the one or more other measurements.

In a variant, receiving the indication may further include receiving the indication at a reporting time periodicity that differs from reception of the one or more reports. In a variant, the one or more thresholds may be at least one of transmitted via signaling, pre-configured, or based on a reported channel quality indicator.

In a variant, the method may include transmitting a configuration of at least one state, transmitting a reporting configuration or a resource configuration, and transmitting, prior to receiving the indication, an activation of one or more of the at least one state.

The activation may result in the one or more activated transmission configuration indicator states. In a variant, the indication may indicate at least one of that at least one of the one or more measurements satisfies at least one of the one or more thresholds, or that at least one of the one or more measurements fails to satisfy at least one of the one or more thresholds.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for performing at least the method according to the first embodiment or the second embodiment, or any of the variants discussed above.

A seventh embodiment may be directed to a computer program product encoding instructions for performing at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
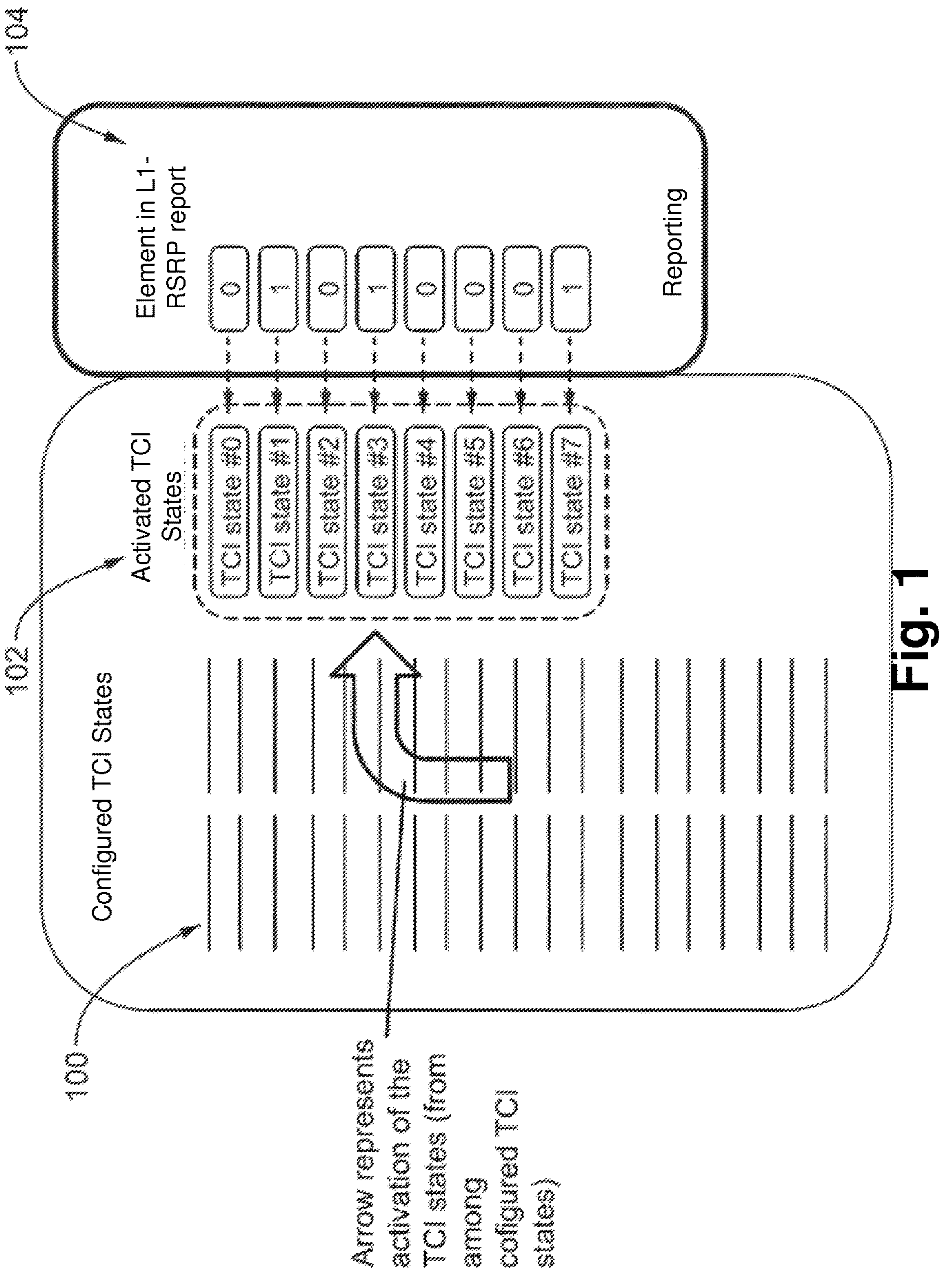
FIG. 1 illustrates an example of reporting of feasibility of activated transmission configuration indicator/transmission coordination indication (TCI) states, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reporting of feasibility of activated TCI states is not intended to limit the scope of certain embodiments but is representative of selected example embodiments. Depending on the context, TCI may refer to a transmission configuration indicator or to a transmission coordination indication, and certain embodiments described herein apply to both a transmission configuration indicator and a transmission coordination indication. In other words, "TCI" may refer to a transmission configuration indicator and/or a transmission coordination indication, and "transmission configuration indicator" and "transmission coordination indication" may be used interchangeably with respect to certain embodiments described herein.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR may utilize beam management enhancements that can be applied to both single- and multi-transmission and reception point (TRP) scenarios. In a multi-TRP scenario, a serving cell may use multiple TRPs, which can be co-located or non-co-located, to transmit to, and receive signals from, the UE. Further, targeted deployment scenarios may include access links in frequency range 2 (FR2) (carrier frequency range between 24 and 52.6 gigahertz (GHz)) and carrier frequencies above 52.6 GHz (although certain embodiments described herein may also be applicable to integrated access and backhaul (IAB) and frequency range 1 (FR1) scenarios as well). Operation in FR2 and above 52.6 GHz may be beam-based, where both a gNB and UE may operate using more narrow radiation patterns for transmission and reception than compared with sector-wide and omni-directional beams, respectively.

In a multi-TRP scenario, the UE may have multiple beam pair links active at a time (e.g., associated with different TRPs for downlink and uplink signals, reference signals, and channels). The transmission coordination information framework may be used for beam indication (or beam pair link indication) in downlink, where the UE may be provided a TCI state comprising QCL source RS(s) based on which the UE may be able to perform reception of certain target signals. There may be four different types of QCL source RSs, namely TypeA, TypeB, TypeC and TypeD. QCL TypeD may represent the spatial receive (RX) parameter and may be the one used as a beam/beam pair link indication. This may assist the UE in setting up its receive beam properly in order to receive certain target signals. For example, a target signal may include a channel state information reference signal (CSI-RS) (e.g., for beam management, time-and frequency tracking, and CSI acquisition), a demodulation reference signal (DMRS) of a physical downlink control channel (PDCCH), a DMRS of a physical downlink shared channel (PDSCH), and/or a phase tracking reference signal (PTRS).

Certain enhancements to NR may relate to supporting fast layer 1 (L1) beam indication among activated TCI states and for other signals/reference signals/channels than for PDSCH, thereby relating to a TCI indication framework for both DL and UL. Up to 8 TCI states or TCI state combinations can be activated for the UE. Accordingly, up to 8 candidate transmit (TX) beams or beam combinations (two TX beams) can be dynamically allocated for the UE and indicated via downlink control information (DCI) for PDSCH. In other words, once a TCI state is activated, the UE may be expected be able to receive without any long scheduling offset. This may allow, for example, a UE to switch on a panel when the TCI state is indicated in the DCI together with the scheduling grant for the PDSCH or with the triggering state indication for the aperiodic CSI-RS. The UE may be expected to have activated the panel that is needed for the reception. When the TCI state is being activated, a 3 millisecond (ms) additional time delay may be assumed in order to enable the UE to switch on an antenna panel if needed.

The basis for beam indication/TCI state indication may be L1-reference signal received power (RSRP)/L1-signal-to-noise and interference ratio (SINR) measurements and reporting on synchronization signal and physical broadcast channel blocks (SSBs) and/or CSI-RS resources (e.g., in which the UE provides information to a gNB regarding adequate candidate downlink (DL) RSs that can act as QCL sources in downlink, or spatial relation information in uplink (UL)). In one beam report, a UE can report 1, 2, or 4 resources of a RS/signal corresponding to the best L1-RSRP results, depending on a configured value for the nrofReportedRS parameter. In a case where the number of activated TCI states is greater than the value of the nrofReportedRS parameter, there may be active TCI states that do not have up-to-date measurement results available. The beam pair link corresponding to a certain TCI state may be experiencing a blockage or have a low quality currently in DL, may suffer from a maximum permissible exposure (MPE) issue in the UL direction, and/or the like.

Thus, there is a risk that a gNB selects a TCI state for DL or UL transmission that is experiencing a blockage for the PDSCH transmission or for another signal/reference signal/channel transmission (DL or UL), that is suffering an MPE issue in UL, that cannot receive or transmit to a direction that corresponds to the certain activated/indicated TCI state due to rotation of the UE's active antenna panel(s), and/or the like. Improper TCI state selection may have a negative impact on system performance, user experience/latency, robustness, and/or the like. As such, there is a need to provide support for a linkage between reported resources of RSs/signals and current activated TCI states.

Some embodiments described herein may provide for reporting of feasibility of activated TCI states (e.g., an activated TCI state may indicate an active beam pair between a user equipment and a network node). For example, a UE may determine whether one or more measurements satisfy one or more thresholds for one or more activated TCI states, and may transmit an indication of whether the one or more measurements satisfy the one or more thresholds. The UE may then deactivate at least one of the one or more activated TCI states, or activate one or more additional TCI states, based on the indication, and may use one or more of the activated TCI states for a DL or UL transmission. In this way, certain embodiments may support introducing fast beam and panel selection for DL and/or for UL. Additionally, or alternatively, in this way, a network node (e.g., a gNB) may have more up-to-date information about current candidate beams for the UE. Additionally, or alternatively, in this way, certain embodiments may reduce a probability of beam failure/radio link failure.

FIG. 1 illustrates an example of reporting of feasibility of activated TCI states, according to some embodiments. For example, FIG. 1 illustrates operations of a UE. As illustrated at 100, the UE may be configured with TCI states (e.g., a set of configured TCI states illustrated as black lines). As illustrated at 102, from this set of configured TCI states, the UE may activate one or more of the configured TCI states to form a set of activated TCI states. The activated TCI states are illustrated in FIG. 1 as TCI state #0 through TCI state #7. As illustrated at 104, the UE may determine values for indications associated with the activated TCI states. For example, the UE may determine whether one or more measurements related to the activated TCI states satisfy one or more thresholds. In the example illustrated in FIG. 1, a value of "0" may indicate that the measurement for an associated activated TCI state fails to satisfy a threshold and that a value of "1" may indicate that the measurement for the associated activated TCI state satisfies the threshold. The UE may include the indications for the activated TCI states as an element in a L1-RSRP report.

In this way, certain embodiments may provide L1-based beam reporting of a non-feasible/feasible indication for the current active TCI states (e.g., a non-feasible TCI state may be associated with a measurement that fails to satisfy a threshold and is not to be used for a transmission, and a feasible TCI state may be associated with a measurement that satisfies the threshold and can be used for a transmission). With this L1-TCI state feasibility reporting, the UE may indicate one or more beams (e.g., the best beams associated with the nrofReportedRS parameter-indicated beams) and a bitmap indication value of "1"=feasible (greater than, or greater than or equal to, a threshold) or a bitmap indication value of "0"=non-feasible (less than, or less than or equal to, the threshold). According to certain embodiments, it may be possible to have separate beam reporting for L1 reports and the indications described herein (e.g., different reporting time periodicities for L1-RSRP/L1-SINR reporting and TCI state feasibility indication). In some embodiments, the threshold(s) may be determined by a network node and signalled using, for example, radio resource control (RRC), to the UE or the threshold(s) may be pre-configured.

The UE may exclude, from the transmitted feasibility indication report (e.g., illustrated at 104), the TCI states for which the UE reports a L1-RSRP or L1-SINR result in the same report. For example, if UE reports L1-RSRP or L1-SINR for a DL RS corresponding to a TCI state, the UE may exclude a feasibility indication for the TCI state from the bitmap.

Upon the reception of the TCI state feasibility indication report from the UE, the network node may update an active TCI list (with activation/deactivation delay). For example, the network node may deactivate any of the activated TCI states that the UE indicated as failing to satisfy a threshold, or may activate any previously inactive TCI states that the UE indicated as satisfying the threshold. Additionally, or alternatively, the UE may assume, after transmitting the report, that the TCI states that were indicated as being non-feasible are deactivated, or that the TCI states that were indicated as being feasible are activated. This may provide lower latency as the UE would not need to wait for signalling from the network node prior to deactivating or activating a TCI state.

Certain embodiments may use a reporting configuration for separate feasibility reporting. For example, in the separate feasibility reporting, an additional reporting configuration may be defined with a configurable time periodicity (e.g., short) and no resource configuration in RRC, but resources may be dynamically allocated or assumed by the UE. (e.g., QCL-TypeD RSs of active TCI states).

As described above, FIG. 1 is provided as an example. Other examples are possible, according to some embodiments.

Figure 2:
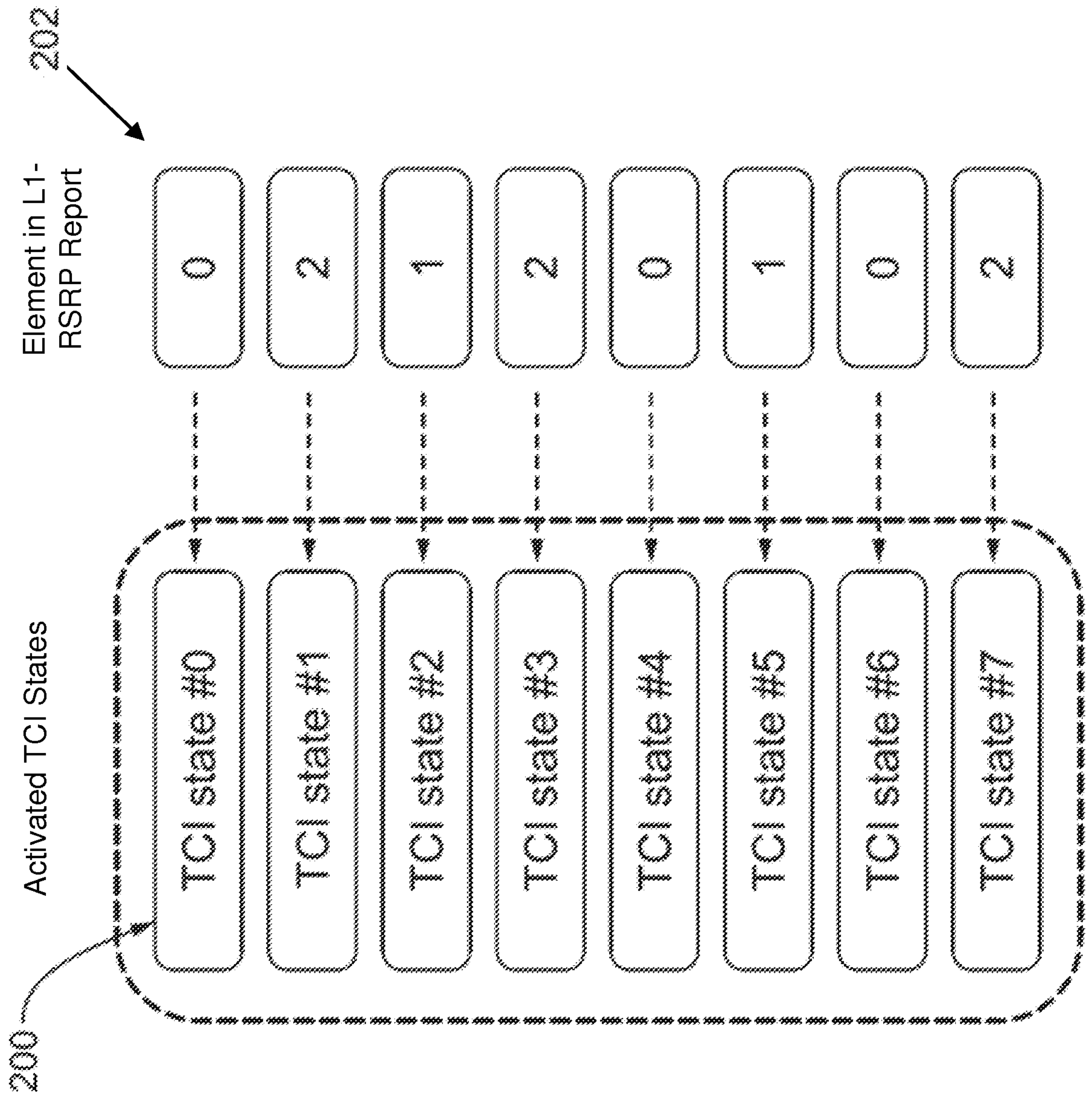
FIG. 2 illustrates an example of multi-level feasibility reporting of activated TCI states, according to some embodiments.

FIG. 2 illustrates an example of multi-level feasibility reporting of activated TCI states, according to some embodiments. For example, FIG. 2 illustrates reporting performed by a UE. As illustrated at 200, the UE may be associated with a set of activated TCI states. For example, the UE may be associated with activated TCI state #0 through TCI state #7. As illustrated at 202, the UE may determine values for indications to be included in a report (e.g., the indications may indicate whether one or more measurements for the activated TCI states satisfy one or more thresholds). For example, the value "0" may indicate that the measurements fail to satisfy two thresholds (e.g., indicating that the TCI state is not feasible for use or is in a failure condition (based on multiple measurements)), the value of "1" may indicate that the measurements satisfy one threshold but fail to satisfy another threshold (e.g., indicating that the TCI state is possibly feasible for use based on low spectral efficiency (SE) or temporarily low SE (based on a single measurement)), and the value of "2" may indicate that the measurements satisfy both thresholds (e.g., indicating that the TCI state is feasible for use based on high SE).

In some embodiments, the UE may provide multiple reports to the network node. For example, the UE may provide two reports where, in the first report, TCI states associated with values "1" or "2" may be reported, while in a second report, TCI states associated with values "1" and "0" may be reported. The two reports may be configured with different periodicities (e.g., the second report could be configured with higher periodicity than the first report).

The threshold for SE can be configured by a network node. Alternatively, the UE may use the latest reported channel quality indicator (CQI) as the reference for a threshold (e.g., the SE threshold to determine "1" or "2" values). Certain embodiments may use a reporting configuration. For example, for periodic reporting, the UE may be configured to provide, in alternating occasions, a first report of "2"/not "2" values and a second report of "1"/"0" values. Alternatively, the UE may provide both of these reports in each occasion. If any of the reports are to be dropped, the UE may prioritize dropping the second report (e.g., the report of "1"/"0" values). For semi-persistent reporting, the UE may provide reports in a manner similar to that described for periodic reporting. For aperiodic reporting, the UE may be triggered to provide either of the reports or both at a same time.

In some embodiments, a UL-focused TCI state feasibility report may be considered for a fast UL beam (and/or antenna panel) selection. The immediate UL transmission capability, which can indicate, for example, a current MPE issue (or upcoming MPE condition), can be provided to the network node. Separate feasibility reporting can be used for UL purposes, for example, to address MPE issues with certain TCI state(s) in UL.

Certain embodiments described herein may utilize techniques to reduce reporting overhead. For example, a 1-bit indication (which may be a negligible overhead) may be defined to notify the network whether at least N different TCIs are associated with measurements that fail to satisfy one or more thresholds. The network node may activate the reporting (e.g., semi-persistent on PUCCH resources) so that the UE informs the network node about which TCIs are associated with one or more measurements that fail to satisfy one or more thresholds, and may react accordingly, as described elsewhere herein. In some embodiments, a network node can trigger a UE to report feasible TCI states and/or non-feasible states with conventional beam reporting.

As indicated above, FIG. 2 is provided as an example. Other examples are possible, according to some embodiments.

Figure 3:
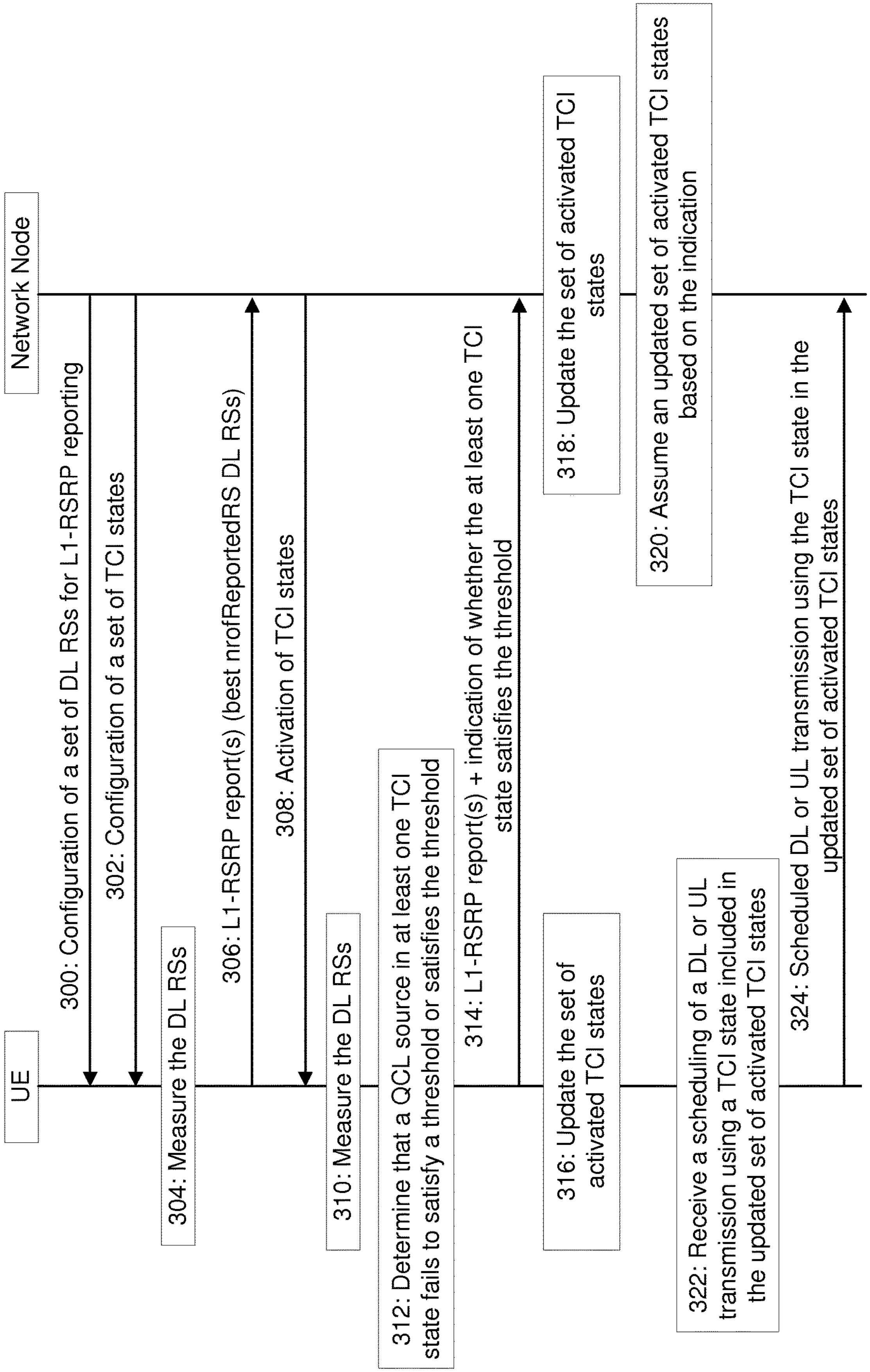
FIG. 3 illustrates an example signal diagram of reporting of feasibility of activated TCI states, according to some embodiments.

FIG. 3 illustrates an example signal diagram of reporting of feasibility of activated TCI states, according to some embodiments. FIG. 3 illustrates a UE and a network node (e.g., a gNB). As illustrated at 300, the network node may transmit, and the UE may receive, a configuration of a set of DL RSs for L1-RSRP reporting. As illustrated at 302, the network node may transmit, and the UE may receive, a configuration of a set of TCI states (e.g., similar to that at 100). As illustrated at 304, the UE may measure the DL RSs. As illustrated at 306, the UE may transmit, and the network node may receive, L1-RSRP report(s). For example, the report(s) may indicate the DL RSs associated with the nrofReportedRS parameter. As illustrated at 308, the network node may transmit, and the UE may receive, activation of TCI states (e.g., activation of one or more of the configured TCI states). For example, the activation may form a set of activated TCI states similar to that at 102 in FIG. 1 or 200 in FIG. 2.

As illustrated at 310, the UE may measure the DL RSs. As illustrated at 312, the UE may determine that a QCL source in at least one TCI state (at least one of the activated TCI states) fails to satisfy a threshold. In some embodiments, the UE may determine that a QCL source in at least one inactive TCI state satisfies the threshold. As illustrated at 314, the UE may transmit, and the network node may receive, L1-RSRP report(s) and an indication of whether the at least one TCI state (at least one activated TCI state or at least one inactive TCI state) satisfies the threshold. For example, the report may include indications similar to that at 104 in FIG. 1 or 202 in FIG. 2.

As illustrated at 316 and 318, the UE and/or network node, respectively, may update the set of activated TCI states. For example, the UE and/or the network node may activate one or more additional TCI states and/or may deactivate one or more of the activated TCI states. In some embodiments, the UE may implicitly update the set of TCI states based on the indication and/or may update the set of TCI states based on an explicit indication from the network node to activate or deactivate certain TCI states. As illustrated at 320, the network node may assume an updated set of activated TCI states based on the indication. For example, the network node may assume that both the network node and the UE will update the set of activated TCI states in a similar manner based on whether the one or more measurements for the TCI states satisfy the one or more thresholds.

As illustrated at 322, the UE may receive a scheduling of a DL or a UL transmission using a TCI state included in the updated set of activated TCI states. For example, the network node may schedule the DL or the UL transmission and may transmit, to the UE, information identifying the scheduling. As illustrated at 324, the UE may transmit, and the network node may receive, the scheduled DL or UL transmission using the TCI state in the updated set of activated TCI states.

As described above, FIG. 3 is provided as an example. Other examples are possible, according to some embodiments.

Figure 4:
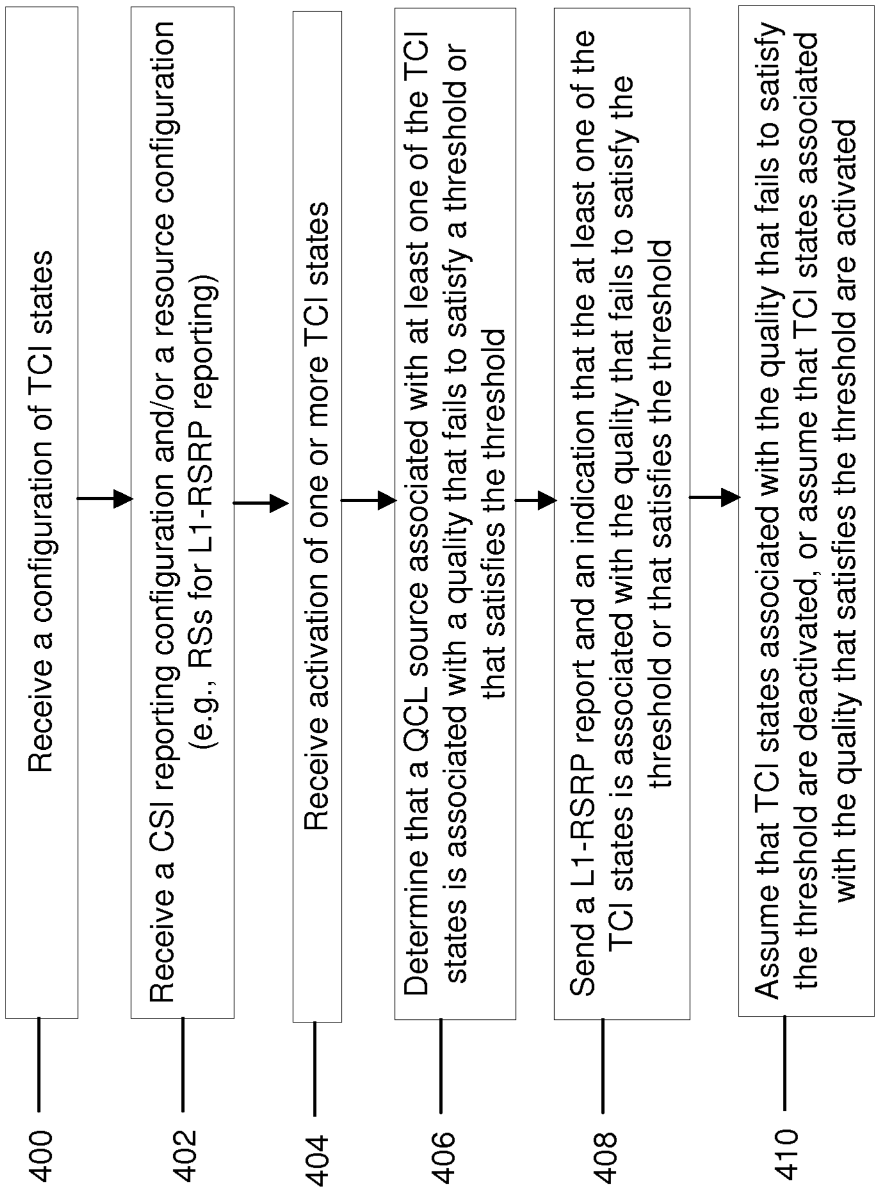
FIG. 4 illustrates an example flow diagram of a method of reporting of feasibility of activated TCI states, according to some embodiments.

FIG. 4 illustrates an example flow diagram of a method of reporting of feasibility of activated TCI states, according to some embodiments. For example, FIG. 4 shows example operations of a UE. Some of the operations illustrated in FIG. 4 may be similar to some operations shown in, and described with respect to, FIGS. 1-2 and 5-8.

The method may include, at 400, receiving a configuration of TCI states, in a manner similar to that described at 100 in FIGS. 1 and/or 302 in FIG. 3. The method may include, at 402, receiving a CSI reporting configuration and/or a resource configuration (e.g., RSs for L1-RSRP reporting), in a manner similar to that described at 300 in FIG. 3. The method may include, at 404, receiving activation of one or more TCI states, in a manner similar to that described at 102, 200, and/or 308. The method may include, at 406, determining that a QCL source associated with at least one of the TCI states is associated with a quality that fails to satisfy a threshold or that satisfies the threshold, in a manner similar to that described at 104, 202, and/or 312. The method may include, at 408, sending a L1-RSRP report and an indication that the at least one of the activated TCI states is associated with the quality that fails to satisfy the threshold or that satisfies the threshold, in a manner similar to that described at 104, 202, and/or 314. The method may include, at 410, assuming TCI states associated with the quality that fails to satisfy the threshold are deactivated, or assuming that TCI states associated with the quality that satisfies the threshold are activated, in a manner similar to that described at 316.

As described above, FIG. 4 is provided as an example. Other examples are possible, according to some embodiments.

Figure 5:
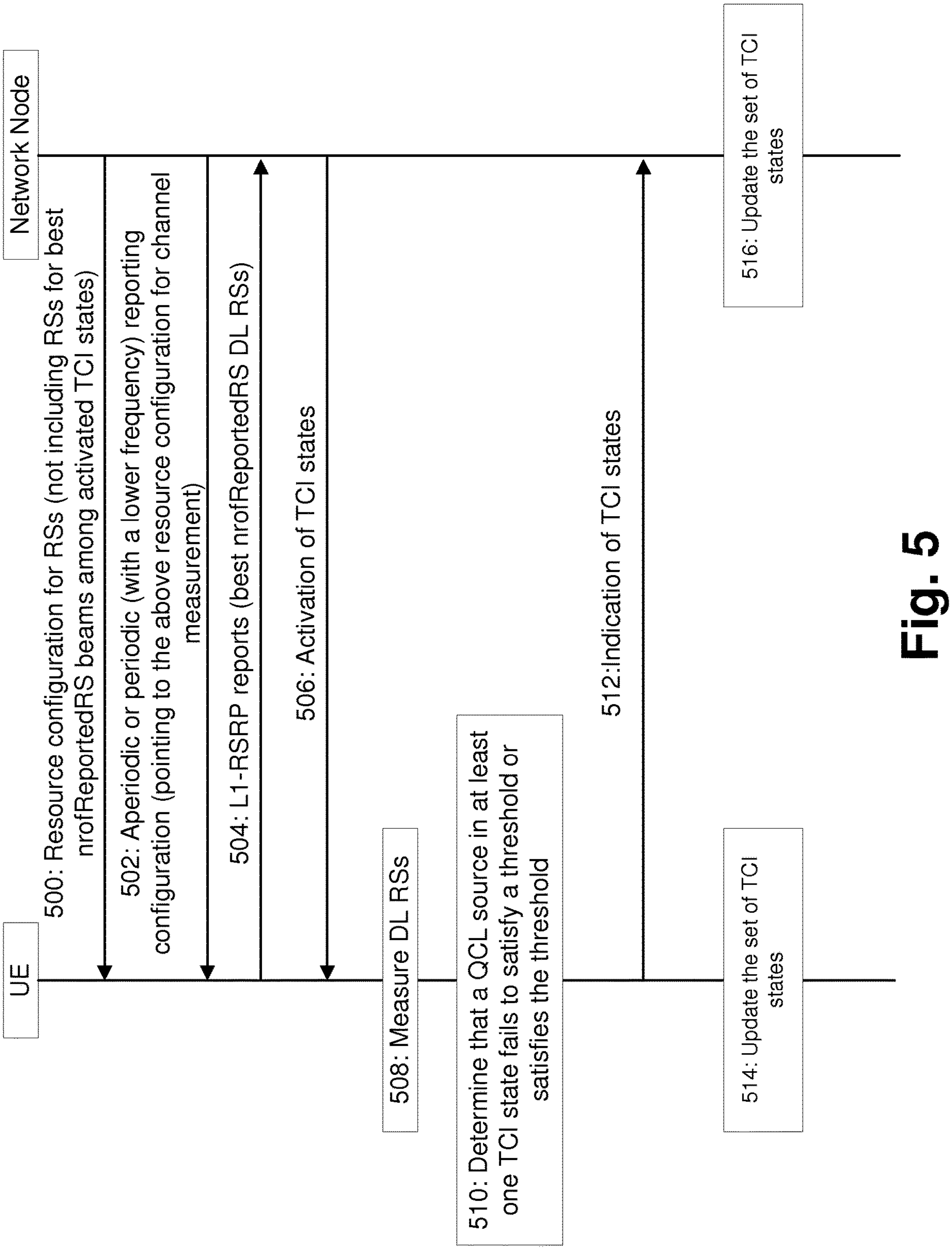
FIG. 5 illustrates an example signal diagram of reporting of feasibility of activated TCI states, according to some embodiments.

FIG. 5 illustrates an example signal diagram for reporting of feasibility of activated TCI states, according to some embodiments. The example of FIG. 5 illustrates a UE and network node. As illustrated at 500, the network node may transmit, and the UE may receive, a resource configuration for RSs. The resource configuration may not include RSs for the best nrofReportedRS parameter-indicated beams among activated TCI states. As illustrated at 502, the network node may transmit, and the UE may receive, an aperiodic or a periodic (with a lower frequency) reporting configuration. The reporting configuration may point to a configuration for channel measurement. As illustrated at 504, the UE may transmit, and the network node may receive, L1-RSRP reports. For example, the reports may include information related to the best nrofReportedRS parameter-indicated DL RSs.

Operations 506, 508, and 510 may be performed in a manner similar to that described at 308, 310, and 312, respectively, of FIG. 3. As illustrated at 512, the UE may transmit, and the network node may receive, an indication of TCI states. For example, the indication may be similar to that described at 104 and/or 202. Operations 514 and 516 may be performed in a manner similar to that described at 316 and 318, respectively.

In this way, certain embodiments may, via RRC, define a resource configuration for RSs, but not including RSs for the best nrofReportedRS parameter-indicated beams among the active TCI states. Additionally, or alternatively, certain embodiments may, via RRC, define an aperiodic or a periodic (with a lower frequency) reporting configuration pointing to the resource configuration for channel measurement. This report can identify the best nrofReportedRS parameter-indicated beams. Depending on a first threshold, the beams that fail to satisfy the first threshold may be determined to be non-feasible. Certain embodiments may include a bitmap indication of "1"=temporarily feasible or non-feasible beams (>a second threshold) and "0"=not feasible beams (<=the second threshold). The non-feasible beams may be deactivated. Via RRC, certain embodiments may periodically reconfigure the resource configuration based on a result of defining the resource configuration and may update of the set of TCI states.

As described above, FIG. 5 is provided as an example. Other examples are possible, according to some embodiments.

Figure 6:
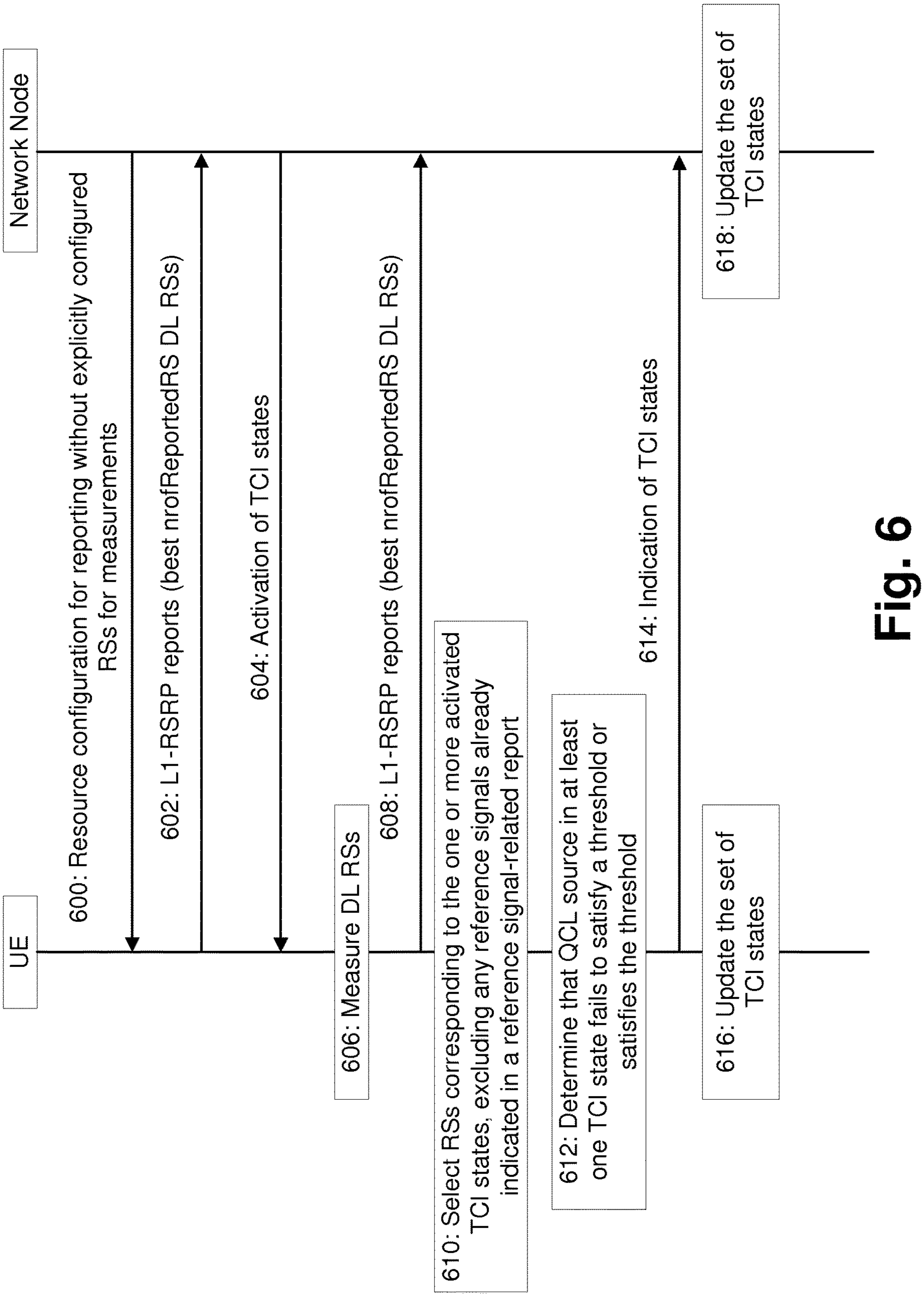
FIG. 6 illustrates an example signal diagram of reporting of feasibility of activated TCI states, according to some embodiments.

FIG. 6 illustrates an example signal diagram for reporting of feasibility of activated TCI states, according to some embodiments. The example of FIG. 6 illustrates a UE and a network node. As illustrated at 600, the UE may receive a resource configuration for reporting without explicitly configured RSs for measurements. Operations 602, 604, 606, and 608 may be performed in a manner similar to operations 504, 506, 508, and 504, respectively, in FIG. 5. As illustrated at 610, the UE may select RSs corresponding to the one or more activated TCI states, excluding any reference signals already indicated in a reference signal-related report. For example, the UE may have a regular L1-RSRP reporting configuration, using which the UE reports the best N (1, 2 or 4) DL RSs to the network node. Certain embodiments may select, for reporting, RSs for which to provide measurements. The RSs may be for active TCI states that do not comprise the DL RSs that were already reported in the L1-RSRP reporting. Operations 612, 614, 616, and 618 may be performed in a manner similar to that described at 510, 512, 514, and 516, respectively.

In this way, certain embodiments may, via RRC, define an aperiodic or a periodic (with a lower frequency) reporting configuration for dynamically allocated resources. Certain embodiments may apply to RSs corresponding to the active TCI states, but not RSs for the best nrofReportedRS parameter-indicated beams among the active TCI states. Certain embodiments may include dynamic triggering using a medium access control control element (MAC CE) or downlink control information (DCI), and including a resource configuration identifier indicated in the trigger. Certain embodiments may include a bitmap indication of "1"=temporarily non-feasible or feasible beams (>a second threshold and <a first threshold) and "0"=non-feasible beams (<=the second threshold and <the first threshold). The non-feasible beams may be deactivated.

As described above, FIG. 6 is provided as an example. Other examples are possible, according to some embodiments.

Figure 7:
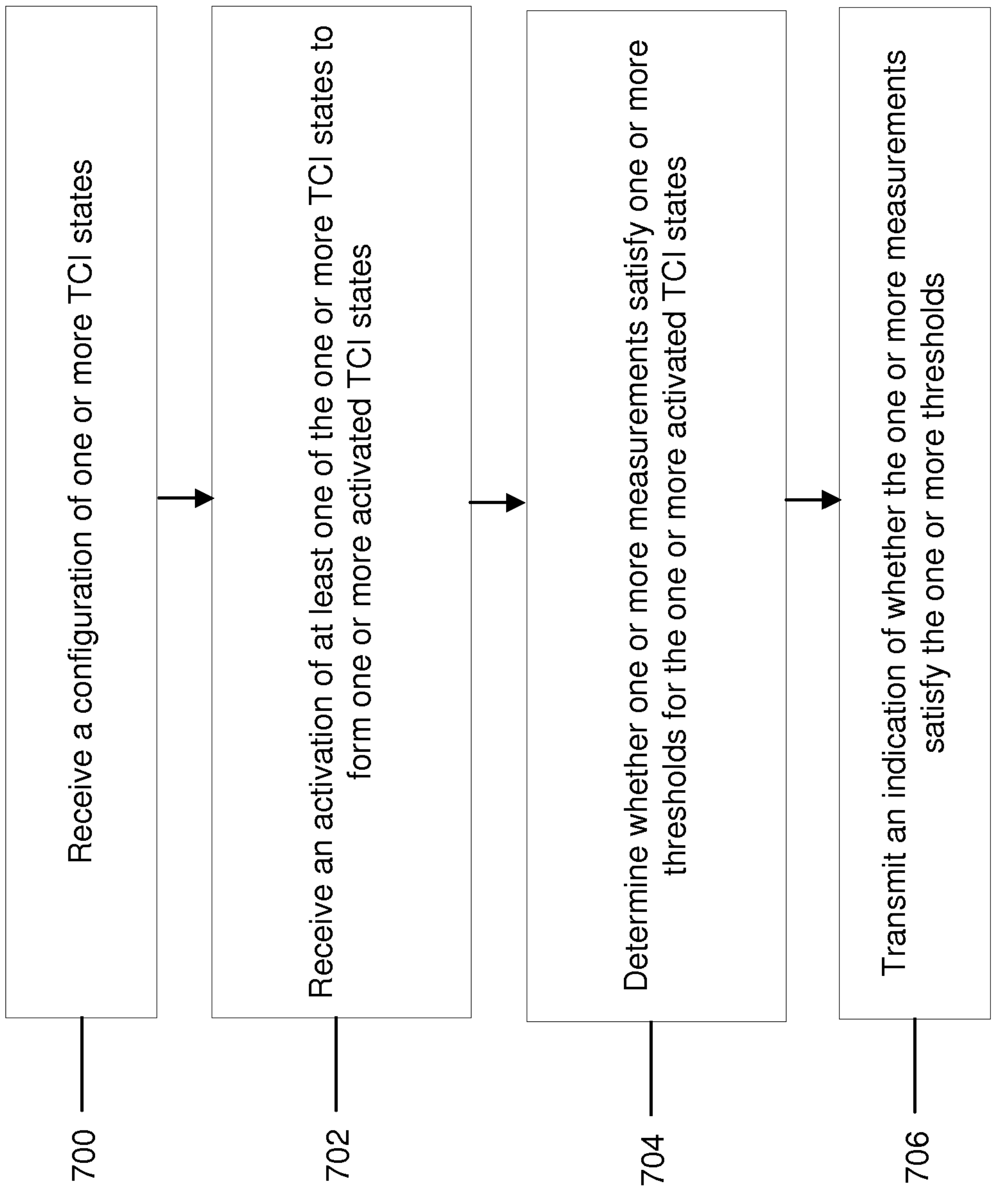
FIG. 7 illustrates an example flow diagram of a method, according to some embodiments.

FIG. 7 illustrates an example flow diagram of a method, according to some embodiments. For example, FIG. 7 shows example operations of a UE (e.g., apparatus 20). Some of the operations illustrated in FIG. 7 may be similar to some operations shown in, and described with respect to, FIGS. 1-6.

In an embodiment, the method may include, at 700, receiving a configuration of one or more TCI states, for example, in a manner similar to that described at 100, 302, and/or 400. In an embodiment, the method may include, at 702, receiving an activation of at least one of the one or more TCI states to form one or more activated TCI states, for example, in a manner similar to that described above at 102, 200, 308, 404, 506, and/or 604. In an embodiment, the method may include, at 704, determining whether one or more measurements satisfy one or more thresholds for the one or more activated TCI states, for example, in a manner similar to that described above at 104, 202, 312, 406, 510, and/or 612. In an embodiment, the method may include, at 706, transmitting an indication of whether the one or more measurements satisfy the one or more thresholds, for example, in a manner similar to that described above at 104, 202, 314, 408, 512, and/or 614.

The UE may perform one or more other operations in connection with the method illustrated in FIG. 7. For example, the UE may transmit L1-RSRP reports, may select RSs, and/or may update the one or more activated TCI states (e.g., by deactivating one or more activated TCI states or activating one or more additional TCI states).

As described above, FIG. 7 is provided as an example. Other examples are possible according to some embodiments.

Figure 8:
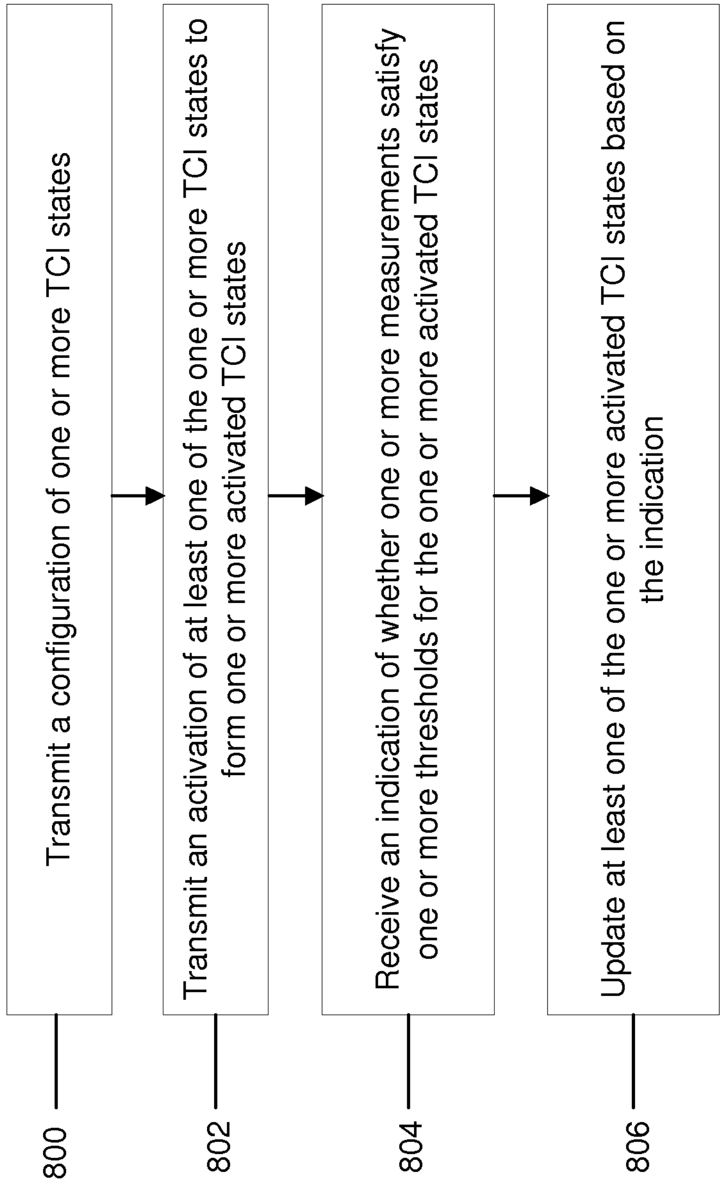
FIG. 8 illustrates an example flow diagram of a method, according to some embodiments.

FIG. 8 illustrates an example flow diagram of a method, according to some embodiments. For example, FIG. 8 shows example operations of a network node (e.g., apparatus 10). Some of the operations illustrated in FIG. 8 may be similar to some operations shown in, and described with respect to, FIGS. 1-6.

In an embodiment, the method may include, at 800, transmitting a configuration of one or more TCI states, for example, in a manner similar to that described above at 100, 302, and/or 400. In an embodiment, the method may include, at 802, transmitting an activation of at least one of the one or more TCI states to form one or more activated TCI states, for example, in a manner similar to that described above at 102, 200, 308, 404, 506, and/or 604. In an embodiment, the method may include, at 804, receiving an indication of whether one or more measurements satisfy one or more thresholds for the one or more activated TCI states, for example, in a manner similar to that described above at 104, 202, 314, 408, 512, and/or 614. In an embodiment, the method may include, at 806, updating at least one of the one or more activated TCI states based on the indication, for example, in a manner similar to that at 318, 516, and/or 618.

The network node may perform one or more other operations in connection with the method illustrated in FIG. 8. For example, the network node may receive an L1-RSRP report, may assume an updated set of activated TCI states, and/or may schedule at least one transmission using the updated set of activated TCI states.

As described above, FIG. 8 is provided as an example. Other examples are possible according to some embodiments.

Figures 9A, 9B:
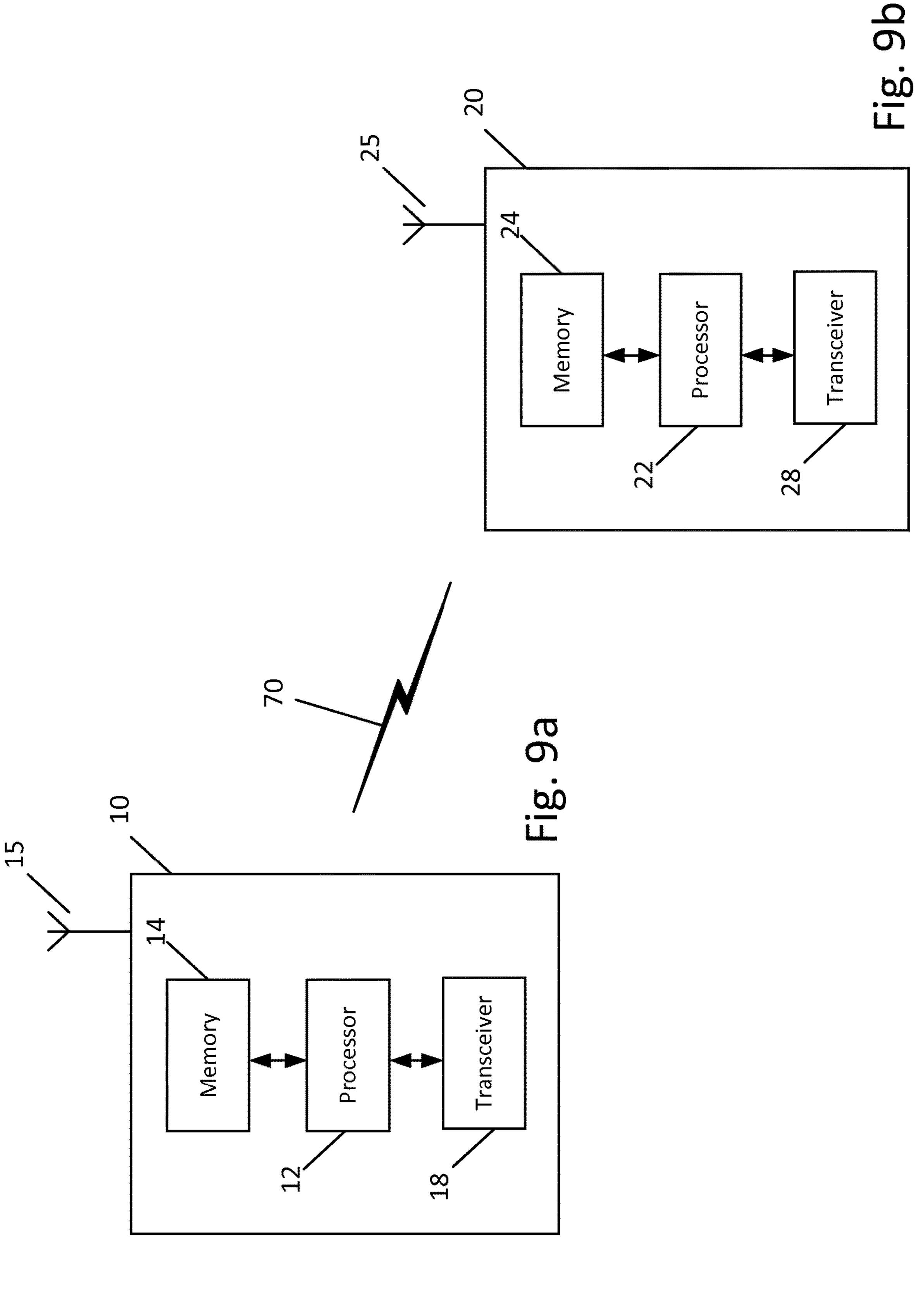
FIG. 9*a* illustrates an example block diagram of an apparatus, according to an embodiment.
FIG. 9*b* illustrates an example block diagram of an apparatus, according to another embodiment.

FIG. 9*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9*a*.

As illustrated in the example of FIG. 9*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-6 and 8. For instance, apparatus 10 may be controlled by memory 14 and processor 12 to perform the method of FIG. 8.

FIG. 9*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9*b*.

As illustrated in the example of FIG. 9*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-7. For instance, in one embodiment, apparatus 20 may be controlled by memory 24 and processor 22 to perform the method of FIG. 7.

In some embodiments, an apparatus may include means for performing a method or any of the variants discussed herein, e.g., methods described with reference to FIGS. 7 and 8. Examples of the means may include one or more processors, memory, and/or computer program codes for causing the performance of the operation.

Therefore, certain example embodiments provide several technological improvements, enhancements, and/or advantages over existing technological processes. For example, one benefit of some example embodiments is support for fast beam and panel selection for DL or UL. As another example benefit, certain embodiments may provide for a network node to have more up to date information about current candidate beams for the UE. As another example benefit, certain embodiments may reduce a probability of beam failure and/or radio link failure. Accordingly, the use of some example embodiments results in improved functioning of communications networks and their nodes and, therefore constitute an improvement at least to the technological field of beam indication, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

Partial Glossary

DL Downlink
DCI Downlink Control Information
gNB 5G NodeB
L1 Layer 1
MPE Maximum Permissible Exposure
MAC CE Medium Access Control Control Element
PUCCH Physical Uplink Control Channel
QCL Quasi-Co-Location
RRC Radio Resource Control
RS Reference Signal
RSRP Reference Signal Received Power
SE Spectral Efficiency
TCI Transmission Configuration Indicator and/or Transmission
Coordination Indication
UE User Equipment
UL Uplink

The invention claimed is:

1. An apparatus, comprising: at least one processor; and at least one memory including computer program code, wherein the at least one memory and the computer program code are configured to, with the at least one processor, cause the apparatus at least to:

determine whether one or more measurements satisfy one or more thresholds for one or more activated transmission configuration indicator states; and transmit, to a network node, an indication of whether the one or more measurements satisfy the one or more thresholds, the indication comprising an uplink-focused transmission configuration indicator state feasibility report for fast uplink beam and panel selection;

wherein the indication is transmitted in conjunction with or separate from one or more reports of one or more other measurements, and is transmitted at a reporting time periodicity that differs from a periodicity of the one or more other measurement reports.

2. The apparatus according to claim 1, wherein the one or more thresholds are at least received via signaling, preconfigured, and based on a reported channel quality indicator.

3. The apparatus according to claim 1, wherein the at least one memory and the computer program code are configured to, with the at least one processor, further cause the apparatus at least to:

update the one or more activated transmission configuration indicator states based on the indication, or update the one or more activated transmission configuration indicator states based on another indication from the network node.

4. The apparatus according to claim 1, wherein the feasibility report comprises an indication of at least one priority level of the one or more activated transmission configuration indicator states.

5. The apparatus according to claim 1, wherein the at least one memory and the computer program code are configured to, with the at least one processor, further cause the apparatus, when transmitting the indication, at least to:

select one or more reference signals corresponding to the one or more activated transmission configuration indicator states, excluding any reference signals already indicated in a reference signal-related report transmitted to the network node.

6. The apparatus according to claim 5, wherein the feasibility report comprises a multi-level feasibility report of activated transmission configuration indicator states.

7. The apparatus according to claim 1, wherein the one or more thresholds are at least: received via signaling, pre-configured, and based on a reported channel quality indicator.

8. The apparatus according to claim 1, wherein the at least one memory and the computer program code are configured to, with the at least one processor, further cause the apparatus at least to receive each of:

a configuration of at least one transmission configuration indicator state;

a reporting configuration or a resource configuration; and prior to determining whether the one or more measurements satisfy the one or more thresholds, an activation of one or more of the at least one transmission configuration indicator state, wherein the activation results in the one or more activated transmission configuration indicator states.

9. The apparatus according to claim 1, wherein the indication indicates at least one of:

that at least one of the one or more measurements satisfies at least one of the one or more thresholds, and that at least one of the one or more measurements fails to satisfy at least one of the one or more thresholds.

10. The apparatus according to claim 1, wherein the at least one memory and the computer program code are configured to, with the at least one processor, further cause the apparatus, when determining whether the one or more measurements satisfy the one or more thresholds, at least to:

determine that the one or more measurements fail to satisfy the one or more thresholds; and wherein the at least one memory and the computer program code are configured to, with the at least one processor, further cause the apparatus, when transmitting the indication, at least to:

transmit the indication of the one or more measurements failing to satisfy the one or more thresholds.

11. The apparatus according to claim 1, wherein the at least one memory and the computer program code are configured to, with the at least one processor, further cause the apparatus at least to:

select one or more reference signals corresponding to the one or more activated transmission configuration indicator states, excluding any reference signals already indicated in a reference signal-related report transmitted to the network node;

wherein the at least one memory and the computer program code are configured to, with the at least one processor, further cause the apparatus, when determining whether the one or more measurements fail to satisfy the one or more thresholds, at least to:

determine that the one or more measurements for the one or more selected reference signals fail to satisfy the one or more thresholds; and wherein the at least one memory and the computer program code are configured to, with the at least one processor, further cause the apparatus, when transmitting the indication, at least to:

transmit the indication of the one or more measurements for the one or more selected reference signals failing to satisfy the one or more thresholds.

12. A method, comprising:

determining, by a user equipment, whether one or more measurements satisfy one or more thresholds for one or more activated transmission configuration indicator states; and transmitting, to a network node, an indication of whether the one or more measurements satisfy the one or more thresholds, the indication comprising an uplink-focused transmission configuration indicator state feasibility report for fast uplink beam and/or panel selection;

wherein the indication is transmitted in conjunction with or separate from one or more reports of one or more other measurements, and is transmitted at a reporting time periodicity that differs from a periodicity of the one or more other measurement reports.

13. The method according to claim 12, wherein the one or more thresholds are selected from the group comprising: (i) thresholds received via signaling, (ii) thresholds pre-configured at the user equipment, and (iii) thresholds based on a reported channel quality indicator.

14. The method according to claim 12, further comprising:

updating the one or more activated transmission configuration indicator states based on the indication, or updating the one or more activated transmission configuration indicator states based on another indication from the network node.

15. The method according to claim 12, further comprising:

receiving a scheduling of at least one transmission using at least one of the one or more activated transmission configuration indicator states after updating the at least one of the one or more activated transmission configuration indicator states.

16. The method according to claim 12, wherein transmitting the indication further comprises:

transmitting the indication in conjunction with one or more reports of one or more other measurements, or transmitting the indication separate from transmitting the one or more reports of the one or more other measurements.

17. The method according to claim 16, wherein the feasibility report is transmitted with a periodicity selected from the group comprising: periodic, semi-persistent, and aperiodic reporting, the periodicity being different from that of other measurement reports.

18. The method according to claim 12, wherein the one or more thresholds are at least one of: received via signaling, pre-configured, or based on a reported channel quality indicator.

19. The method according to claim 12, further comprising receiving each of:

a configuration of at least one transmission configuration indicator state;

a reporting configuration or a resource configuration; and prior to determining whether the one or more measurements satisfy the one or more thresholds, an activation of one or more of the at least one transmission configuration indicator state, wherein the activation results in the one or more activated transmission configuration indicator states.

20. A non-transitory computer-readable medium encoded with instructions that, when executed by an apparatus, cause the apparatus at least to:

determine whether one or more measurements satisfy one or more thresholds for one or more activated transmission configuration indicator states; and transmit, to a network node, an indication of whether the one or more measurements satisfy the one or more thresholds, the indication comprising an uplink-focused transmission configuration indicator state feasibility report for fast uplink beam and/or panel selection;

wherein the indication is transmitted in conjunction with or separate from one or more reports of one or more other measurements, and is transmitted at a reporting time periodicity that differs from a periodicity of the one or more other measurement reports.

* * * * *